(12) United States Patent
Saiki et al.

(10) Patent No.: US 11,066,124 B2
(45) Date of Patent: Jul. 20, 2021

(54) BICYCLE PEDALING TORQUE SENSING SYSTEMS, METHODS, AND DEVICES

(71) Applicant: SPECIALIZED BICYCLE COMPONENTS, INC., Morgan Hill, CA (US)

(72) Inventors: Neal Tate Saiki, Santa Cruz, CA (US); Charles Raymond Teixeira, IV, Bonny Doon, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 301 days.

(21) Appl. No.: 16/225,382

(22) Filed: Dec. 19, 2018

(65) Prior Publication Data

US 2019/0185107 A1    Jun. 20, 2019

Related U.S. Application Data

(60) Provisional application No. 62/608,221, filed on Dec. 20, 2017.

(51) Int. Cl.
*B62M 6/50* (2010.01)
*B62M 3/16* (2006.01)
(Continued)

(52) U.S. Cl.
CPC ............. *B62M 6/50* (2013.01); *B62M 3/16* (2013.01); *G01B 7/18* (2013.01); *G01L 3/1457* (2013.01); *G01L 5/0019* (2013.01); *B62J 45/40* (2020.02)

(58) Field of Classification Search
CPC . B62M 6/50; B62M 6/45; B62M 6/40; B62M 6/55; G01B 7/18; G01L 3/1457; G01L 5/0019; B62J 45/40
See application file for complete search history.

(56) References Cited

U.S. PATENT DOCUMENTS 4,203,319 A * 5/1980 Lechler .................. B23Q 17/09
                                                                     73/862.541
6,490,935 B1    12/2002 Joki et al.
(Continued)

FOREIGN PATENT DOCUMENTS

EP     2436591     4/2012
EP     1642105     3/2013
(Continued)

*Primary Examiner* — Minnah L Seoh
*Assistant Examiner* — Michael R Stabley
(74) *Attorney, Agent, or Firm* — Knobe, Martens, Olson & Bear, LLP

(57) ABSTRACT

A device for sensing a bicycle pedaling torque input includes: a housing; a bearing defining a rotational axis; a bearing support member that positions the bearing with respect to the housing, the bearing support member including one or more beams; an output member configured to be coupled to a chain ring, the output member being coupled to an inner race of the bearing to enable the output member to rotate with respect to the housing about the rotational axis; a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled a beam of the bearing support member.

23 Claims, 11 Drawing Sheets

(51) Int. Cl.
*G01L 5/00* (2006.01)
*G01B 7/16* (2006.01)
*G01L 3/14* (2006.01)
*B62J 45/40* (2020.01)

(56) References Cited

U.S. PATENT DOCUMENTS

| | | | | |
|---|---|---|---|---|
| 6,644,135 | B1* | 11/2003 | Kishimoto | B62M 6/45 |
| | | | | 73/862.338 |
| 7,338,059 | B2* | 3/2008 | Sugimoto | B62K 25/005 |
| | | | | 180/206.4 |
| 7,650,802 | B2* | 1/2010 | Duret | G01L 5/0019 |
| | | | | 73/862.322 |
| 7,806,006 | B2* | 10/2010 | Phillips | G01L 3/1457 |
| | | | | 73/862.338 |
| 7,971,490 | B2 | 7/2011 | Fleury et al. | |
| 8,117,923 | B2* | 2/2012 | Sasaki | B62M 3/003 |
| | | | | 73/862.49 |
| 8,453,521 | B2* | 6/2013 | Sasaki | G01L 3/242 |
| | | | | 73/862.49 |
| 8,708,084 | B2* | 4/2014 | Kuroki | B62M 6/70 |
| | | | | 180/206.1 |
| 8,714,024 | B2 | 5/2014 | Fleury et al. | |
| 8,797,027 | B2* | 8/2014 | Glueck | B62M 3/003 |
| | | | | 324/207.25 |
| 9,227,694 | B2* | 1/2016 | Hino | B62M 6/55 |
| 9,227,695 | B2* | 1/2016 | Liu | B62K 19/34 |
| 9,689,764 | B1 | 6/2017 | Roopnarine | |
| 2007/0099735 | A1 | 5/2007 | Roovers et al. | |
| 2008/0314193 | A1* | 12/2008 | Meggiolan | B62M 3/003 |
| | | | | 74/594.1 |
| 2012/0234108 | A1* | 9/2012 | Janecek | B62M 6/50 |
| | | | | 73/862.338 |
| 2012/0285265 | A1 | 11/2012 | Sasaki | |
| 2014/0397442 | | 2/2014 | Tanaka et al. | |
| 2014/0200835 | A1* | 7/2014 | Carrasco Vergara | G01L 3/00 |
| | | | | 702/42 |
| 2015/0292612 | A1 | 10/2015 | Morselli et al. | |

FOREIGN PATENT DOCUMENTS

| | | |
|---|---|---|
| EP | 3057861 | 12/2017 |
| WO | WO 03/073057 | 9/2003 |
| WO | WO 2014/172422 | 10/2014 |

* cited by examiner

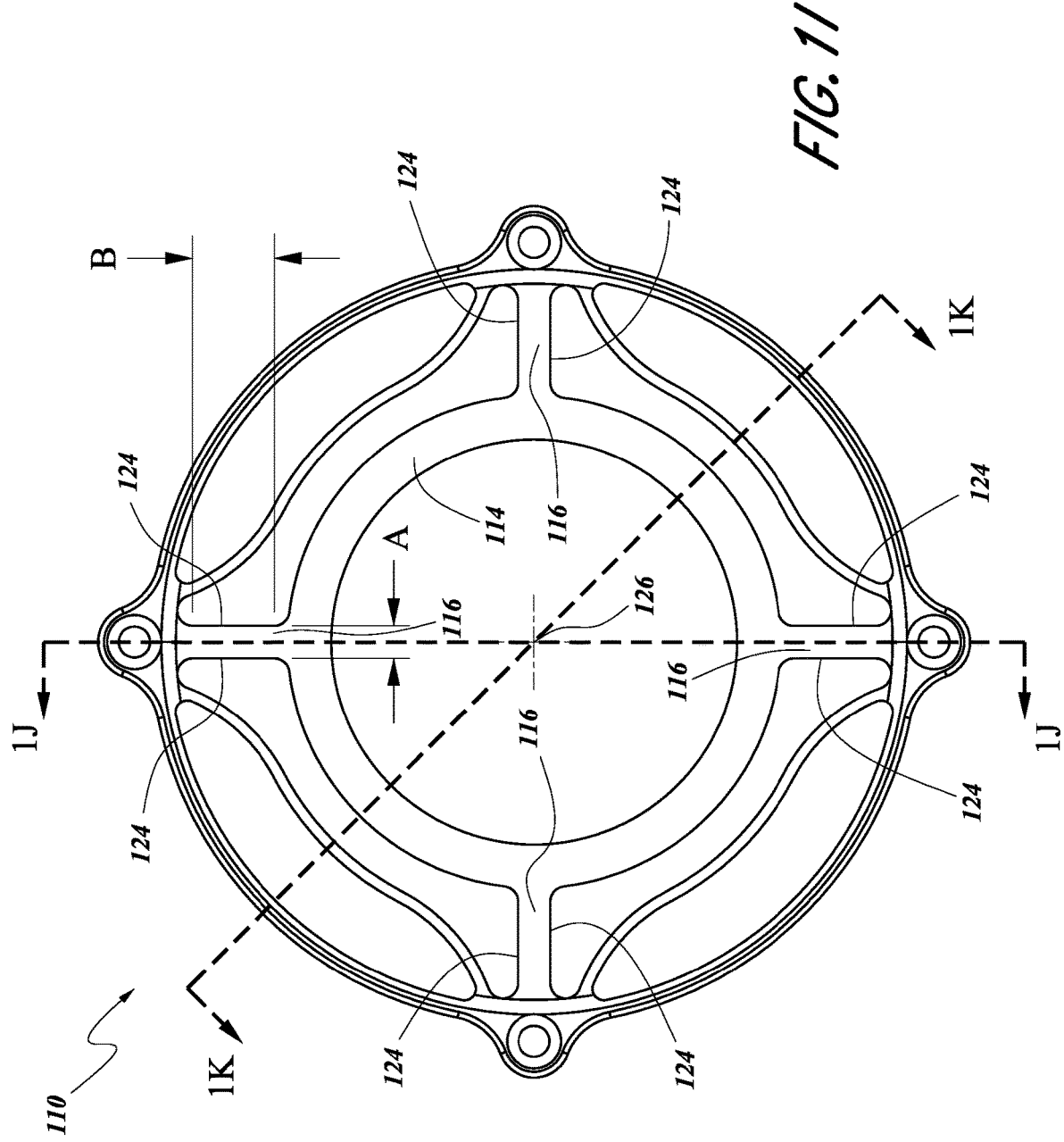

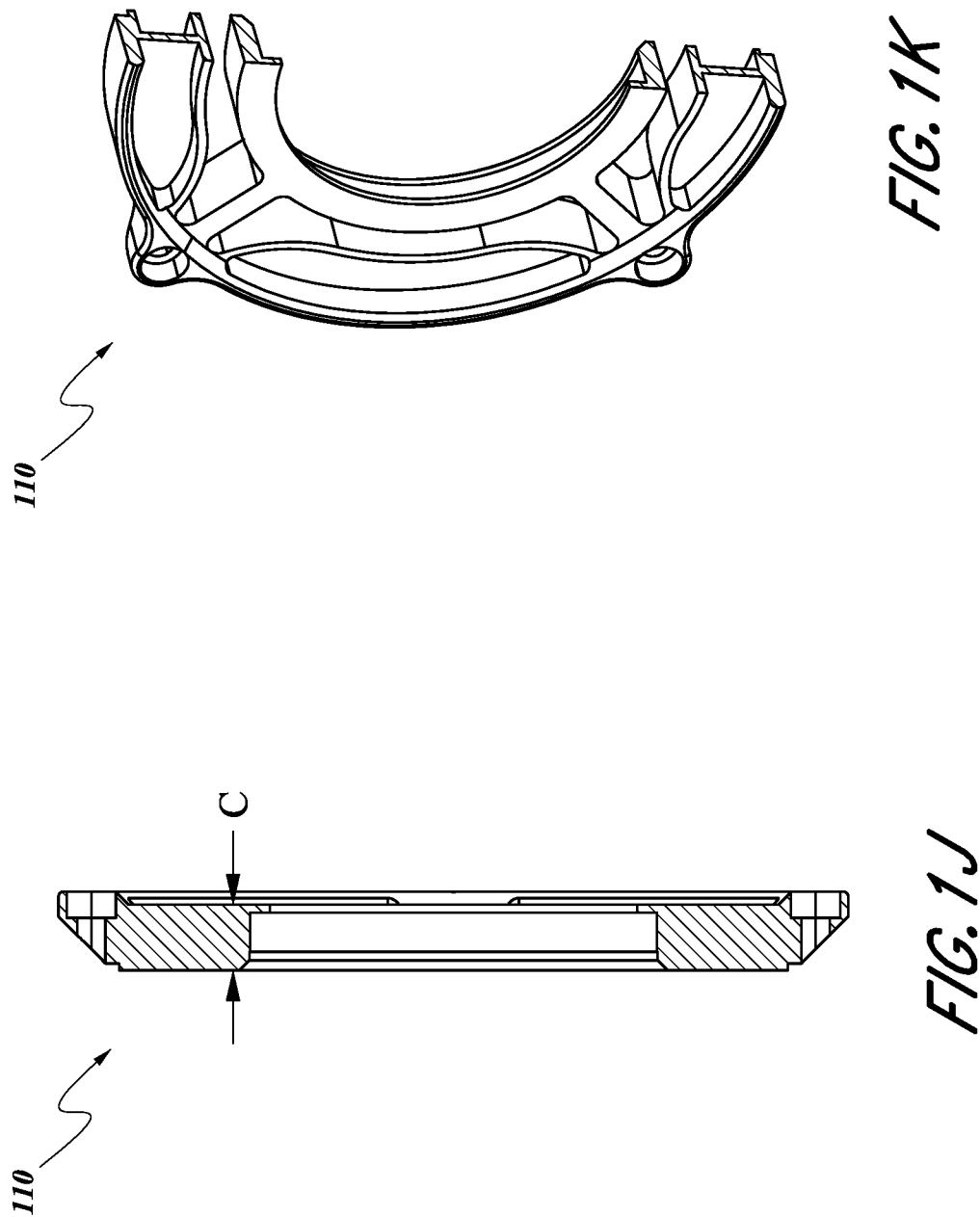

BICYCLE PEDALING TORQUE SENSING SYSTEMS, METHODS, AND DEVICES

CROSS-REFERENCE TO RELATED APPLICATIONS

This application claims priority to U.S. Provisional Patent App. No. 62/608,221, filed Dec. 20, 2017, titled BICYCLE PEDALING FORCE SENSING SYSTEMS, METHODS, AND DEVICES, which is hereby incorporated by reference herein in its entirety.

BACKGROUND

Field

The disclosure relates generally to the field of bicycles, and more specifically to systems, methods, and devices for sensing a rider pedaling torque.

SUMMARY

Electric bicycles are becoming more popular as an efficient means of transportation. Electric bicycles comprise a motor that causes a wheel of the bicycle to rotate without requiring a rider pedaling input torque. Some electric bicycles may have one or more modes, such as a powered mode wherein the motor provides 100% of the power to the wheels of the bicycle, a pedal-only mode wherein the motor provides no power to the wheel, and/or a pedal assist mode wherein the motor can work in conjunction with a rider pedaling torque. In an electric bicycle having a pedal assist mode, it can be desirable to be able to sense the rider's pedaling input torque to enable a controller of the motor to determine when to activate and deactivate the motor and/or how to most efficiently control the motor to work efficiently in conjunction with the rider pedaling input. The disclosure herein presents embodiments of electric bicycle motor assemblies that comprise one or more beams supporting a bearing in a manner that will tend to cause the one or more beams to exhibit strain in response to a rider pedaling input torque and/or a motor torque. One or more strain gauges can be coupled to one or more surfaces of the beams to detect such strain, allowing the controller of the motor to determine the rider pedaling torque and control the motor in response to the rider pedaling torque.

According to some embodiments, a device for sensing a bicycle pedaling torque input comprises: a housing; a bearing defining a rotational axis, the bearing having an inner race and an outer race; a bearing support member that positions the bearing with respect to the housing, the bearing support member comprising: an outer portion coupled to the housing; an inner portion coupled to the outer race of the bearing; and one or more beams positioned about a periphery of the inner portion and connecting the inner portion to the outer portion; an output member configured to be coupled to a chain ring, the output member being coupled to the inner race of the bearing to enable the output member to rotate with respect to the housing about the rotational axis; a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled to one of the one or more beams of the bearing support member to enable electronic sensing of strain in the beam the strain gauge is coupled to in response to the rider pedaling force applied to the spindle.

In some embodiments, the one or more beams comprises a plurality of beams. In some embodiments, the one or more strain gauges comprises a plurality of strain gauges. In some embodiments, the one or more beams are shaped to have a lower resistance to bending about an axis parallel to the rotational axis than to bending about an axis perpendicular to the rotational axis. In some embodiments, the one or more beams comprise a depth measured parallel to the rotational axis and a width measured perpendicular to the rotational axis, the depth being greater than the width. In some embodiments, each of the one or more strain gauges is coupled to a beam surface of the beam to which the strain gauge is coupled that will exhibit tension or compression when the beam bends about an axis parallel to the rotational axis. In some embodiments, each of the one or more strain gauges is coupled to a planar beam surface of the beam to which the strain gauge is coupled that defines a plane parallel to the rotational axis. In some embodiments, the one or more beams comprise a plurality of beams, and the plurality of beams are equally spaced about the periphery of the inner portion of the bearing support member. In some embodiments, the spindle is functionally coupled to the output member through a one-way clutch. In some embodiments, the one or more beams comprises exactly two beams. In some embodiments, the one or more beams comprises exactly three beams. In some embodiments, the one or more beams comprises exactly four beams. In some embodiments, the one or more beams comprises more than four beams. In some embodiments, the device further comprises: a motor coupled to the housing and the output member to enable powered rotation of the output member about the rotational axis; and a controller configured to automatically control the motor at least partially based on strain detected by one or more of the one or more strain gauges. In some embodiments, the device further comprises a bicycle frame, wherein the housing is coupled to or forms a bottom bracket area of the bicycle frame.

According to some embodiments, an electric bicycle comprises: a bicycle frame; a housing coupled to the bicycle frame; a bearing defining a rotational axis, the bearing having an inner race and an outer race; a bearing support member that positions the bearing with respect to the housing, the bearing support member comprising: an outer portion coupled to the housing; an inner portion coupled to the outer race of the bearing; and one or more beams positioned about a periphery of the inner portion and connecting the inner portion to the outer portion; an output member coupled to a chain ring, the output member further being coupled to the inner race of the bearing to enable the output member to rotate with respect to the housing about the rotational axis; a spindle configured to be coupled to a bicycle pedal crank, the spindle functionally coupled to the output member to enable a rider pedaling force applied to the spindle to cause rotation of the output member; one or more strain gauges, each of the one or more strain gauges being coupled to one of the one or more beams of the bearing support member to enable electronic sensing of strain in the beam the strain gauge is coupled to in response to the rider pedaling force applied to the spindle; a motor coupled to the housing and the output member to enable powered rotation of the output member about the rotational axis; and a controller configured to automatically control the motor at least partially based on strain detected by one or more of the one or more strain gauges.

In some embodiments, the one or more beams comprises a plurality of beams. In some embodiments, the one or more strain gauges comprises a plurality of strain gauges. In some embodiments, the one or more beams are shaped to have a lower resistance to bending about an axis parallel to the rotational axis than to bending about an axis perpendicular to the rotational axis. In some embodiments, the one or more beams comprise a depth measured parallel to the rotational axis and a width measured perpendicular to the rotational axis, the depth being greater than the width. In some embodiments, each of the one or more strain gauges is coupled to a beam surface that will exhibit tension or compression when the beam bends about an axis parallel to the rotational axis. In some embodiments, each of the one or more strain gauges is coupled to a planar beam surface that defines a plane parallel to the rotational axis. In some embodiments, the one or more beams comprises a plurality of beams, and the plurality of beams are equally spaced about the periphery of the inner portion of the bearing support member. In some embodiments, the spindle is functionally coupled to the output member through a one-way clutch. In some embodiments, the one or more beams comprises exactly two beams. In some embodiments, the one or more beams comprises exactly three beams. In some embodiments, the one or more beams comprises exactly four beams. In some embodiments, the one or more beams comprises more than four beams.

According to some embodiments, a method of controlling a pedal assist electric bicycle comprises: sensing a value of a horizontal reaction force on a bottom bracket of the pedal assist electric bicycle; converting the value of the horizontal reaction force that is sensed to a total torque value; subtracting a value of motor torque from the total torque value to determine a value of pedal torque; determining, by an electric bicycle controller, a desired motor output based at least partially on the value of the pedal torque that is determined; and outputting a motor control signal to a motor of the pedal assist electric bicycle to cause the motor to produce the desired motor output.

In some embodiments, sensing the value of the horizontal reaction force on the bottom bracket comprises using a device that comprises: a housing; a bearing defining a rotational axis, the bearing having an inner race and an outer race; a bearing support member that positions the bearing with respect to the housing, the bearing support member comprising: an outer portion coupled to the housing; an inner portion coupled to the outer race of the bearing; and one or more beams positioned about a periphery of the inner portion and connecting the inner portion to the outer portion; an output member configured to be coupled to a chain ring, the output member being coupled to the inner race of the bearing to enable the output member to rotate with respect to the housing about the rotational axis; a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled to one of the one or more beams of the bearing support member to enable electronic sensing of strain in the beam the strain gauge is coupled to in response to the rider pedaling force applied to the spindle. In some embodiments, sensing the value of the horizontal reaction force comprises sensing a value of strain in at least one strain gauge that is coupled to a planar surface of a beam that is oriented horizontally. In some embodiments, sensing the value of the horizontal reaction force comprises sensing a value of strain in at least one strain gauge that is coupled to a planar surface of a beam that is oriented at an orientation other than horizontal. In some embodiments, converting the value of the sensed horizontal reaction force to the total torque value comprises multiplying the value of the horizontal reaction force that is sensed by a chain ring radius. In some embodiments, determining the desired motor output comprises determining a value of average or peak pedal torque over at least a last 180 degrees of crank angle.

According to some embodiments, a device for sensing a bicycle pedaling torque input comprises: a housing; a bearing defining a rotational axis, the bearing having an inner race and an outer race; a bearing support member that positions the bearing with respect to the housing, the bearing support member comprising: an outer portion coupled to the housing; an inner portion coupled to the outer race of the bearing; and one or more beams positioned about a periphery of the inner portion and connecting the inner portion to the outer portion; an output member configured to be coupled to a chain ring, the output member being coupled to the inner race of the bearing to enable the output member to rotate with respect to the housing about the rotational axis; a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled to one of the one or more beams of the bearing support member to enable electronic sensing of strain in the beam the strain gauge is coupled to in response to the rider pedaling force applied to the spindle.

In some embodiments, the one or more beams comprises a plurality of beams, and wherein the one or more strain gauges comprises a plurality of strain gauges. In some embodiments, the one or more beams are shaped to have a lower resistance to bending about an axis parallel to the rotational axis than to bending about an axis perpendicular to the rotational axis; wherein the one or more beams comprise a depth measured parallel to the rotational axis and a width measured perpendicular to the rotational axis, the depth being greater than the width; and wherein each of the one or more strain gauges is coupled to a planar beam surface of the beam to which the strain gauge is coupled that defines a plane parallel to the rotational axis. In some embodiments, the one or more beams comprise a plurality of beams, and the plurality of beams are equally spaced about the periphery of the inner portion of the bearing support member. In some embodiments, the spindle is functionally coupled to the output member through a one-way clutch. In some embodiments, the one or more beams comprises more than two beams. In some embodiments, the one or more beams comprises exactly four beams. In some embodiments, the device further comprises: a motor coupled to the housing and the output member to enable powered rotation of the output member about the rotational axis; and a controller configured to automatically control the motor at least partially based on strain detected by one or more of the one or more strain gauges. In some embodiments, the device further comprises a bicycle frame, wherein the housing is coupled to or forms a bottom bracket area of the bicycle frame.

According to some embodiments, a method of controlling a pedal assist electric bicycle comprises: sensing a value of the horizontal reaction force on a bottom bracket of the pedal assist electric bicycle; converting the value of the horizontal reaction force that is sensed to a total torque value; subtracting a value of the motor torque from the total torque value to determine a value of pedal torque; determining, by an electric bicycle controller, a desired motor output based at least partially on the value of the pedal torque that is determined; and outputting a motor control signal to a motor of the pedal assist electric bicycle to cause the motor to produce the desired motor output.

In some embodiments, sensing the horizontal reaction force on the bottom bracket comprises using a device that comprises: a housing; a bearing defining a rotational axis, the bearing having an inner race and an outer race; a bearing support member that positions the bearing with respect to the housing, the bearing support member comprising: an outer portion coupled to the housing; an inner portion coupled to the outer race of the bearing; and one or more beams positioned about a periphery of the inner portion and connecting the inner portion to the outer portion; an output member configured to be coupled to a chain ring, the output member being coupled to the inner race of the bearing to enable the output member to rotate with respect to the housing about the rotational axis; a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled to one of the one or more beams of the bearing support member to enable electronic sensing of strain in the beam the strain gauge is coupled to in response to the rider pedaling force applied to the spindle. In some embodiments, sensing the value of the horizontal reaction force comprises sensing a value of strain in at least one strain gauge that is coupled to a planar surface of a beam that is oriented horizontally. In some embodiments, sensing the value of the horizontal reaction force comprises sensing a value of strain in at least one strain gauge that is coupled to a planar surface of a beam that is oriented at an orientation other than horizontal. In some embodiments, converting the value of the horizontal reaction force to the total torque value comprises multiplying the value of the horizontal reaction force by a chain ring radius. In some embodiments, determining the desired motor output comprises determining a value of average or peak pedal torque over at least a last 180 degrees of crank angle.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present inventions are described in detail below with reference to the drawings of various embodiments, which are intended to illustrate and not to limit the inventions. The drawings comprise the following figures in which:

FIGS. 1A-1K illustrate an embodiment of a mid drive motor assembly comprising pedaling force sensing features.

DETAILED DESCRIPTION OF THE EMBODIMENTS

Figure 1A:
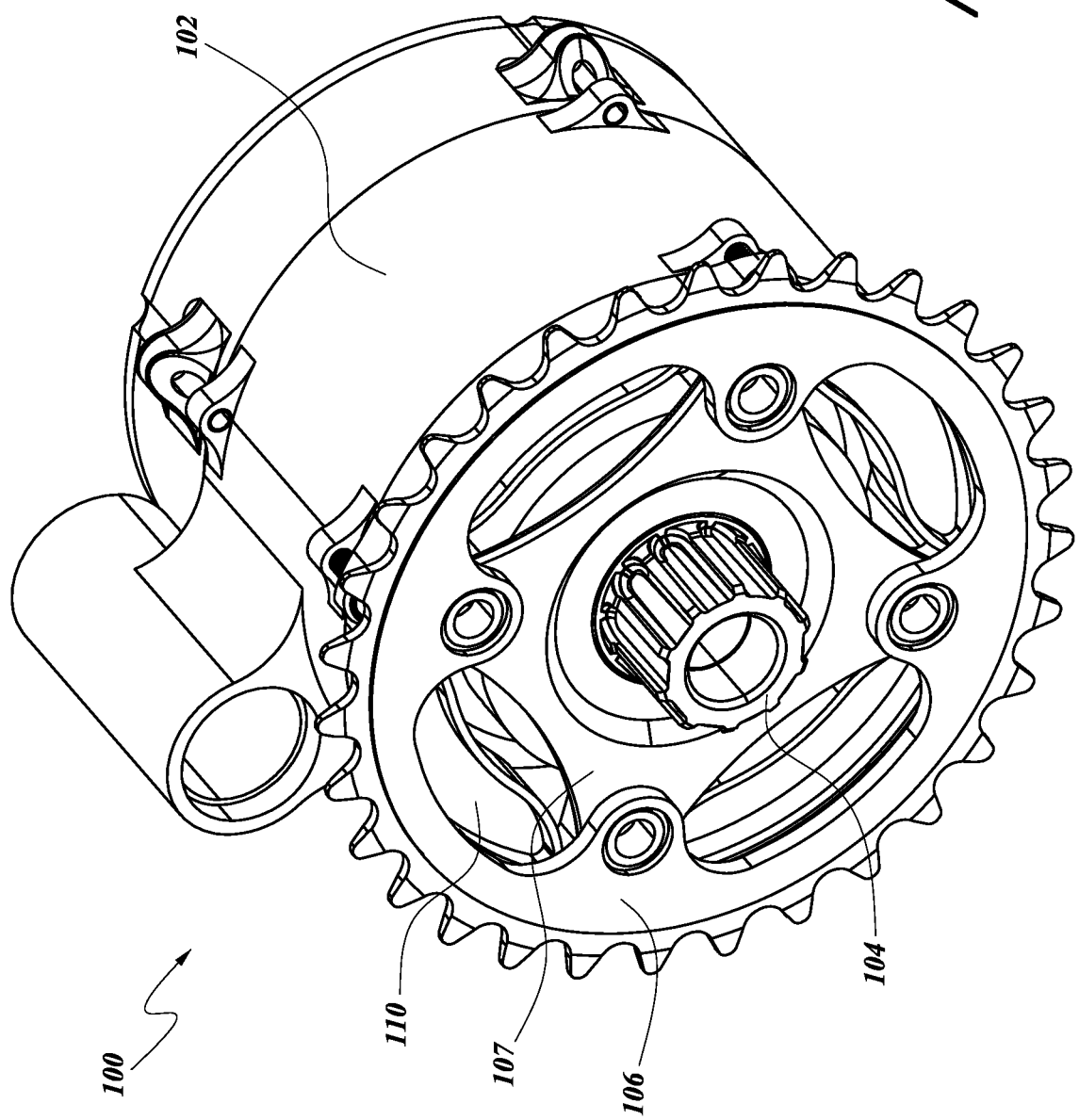

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for their desirable attributes or is essential to practicing the inventions herein described.

Electric bicycles are becoming more popular as an efficient means of transportation. Electric bicycles comprise a motor that causes a wheel of the bicycle to rotate without requiring a rider pedaling input torque. Some electric bicycles may have one or more modes, such as a powered mode wherein the motor provides 100% of the power to the wheels of the bicycle, a pedal-only mode wherein the motor provides no power to the wheel, and/or a pedal assist mode wherein the motor can work in conjunction with a rider pedaling torque. In an electric bicycle having a pedal assist mode, it can be desirable to be able to sense the rider's pedaling input torque to enable a controller of the motor to determine when to activate and deactivate the motor and/or how to most efficiently control the motor to work efficiently in conjunction with the rider pedaling input.

The disclosure herein presents embodiments of electric bicycle motor assemblies that comprise one or more beams supporting a bearing in a manner that will tend to cause the one or more beams to exhibit strain in response to a rider pedaling input torque and/or a motor torque. One or more strain gauges can be coupled to one or more surfaces of the beams to detect such strain, allowing the controller of the motor to determine the rider pedaling torque and control the motor in response to the rider pedaling torque. The disclosure herein also presents techniques that allow the controller to determine the rider pedaling torque even when the strain detected by the one or more strain gauges is a result of more than just the rider pedaling torque. For example, the detected strain may also be at least partially a result of a motor torque, a rider standing on the pedals, and/or the like.

The embodiments disclosed herein can be advantageous for a variety of reasons. For example, positioning of strain gauges on beams that support a bearing (such as a bearing that supports an output member of the motor assembly) can be an efficient use of space, allowing more space within the housing of the motor to be utilized for other features. Such a design can also have other advantages over alternative designs, such as improved torque, higher efficiency, less heat, lower gear reduction, lower weight, and/or the like. Further, the torque sensing designs disclosed herein can be invisible to the rider and allow seamless activation and deactivation of the motor as the rider increases or decreases their pedaling force input.

This disclosure refers to several drawings included herewith that illustrate one example embodiment of a device for sensing a rider pedaling input force in an electric bicycle. In these drawings, a motor assembly for a mid drive electric bicycle is illustrated. The concepts disclosed herein are not limited to mid drive arrangements, however. For example, the concepts disclosed herein may be used with electric bicycles having one or more motors integrated directly into the wheels, an electric bicycle having a motor that is not coaxially aligned with the spindle, such as a jackshaft arrangement, and/or the like. Further, the techniques disclosed herein could be included in a non-electric bicycle to, for example, enable detection of a rider pedaling input torque to be used as an input in a system that controls something other than an electric motor.

Example Pedaling Torque Sensing Device

FIGS. 1A-1K illustrate an example embodiment of a motor assembly 100 for use in a mid drive electric bicycle. The motor assembly 100 comprises a plurality of components that work together to enable sensing or detection of a rider pedaling input torque. This sensing or detection of the rider pedaling input torque may be used, for example, to enable automatic controlling of the motor of the electric bicycle, as further described below.

FIG. 1A illustrates a front perspective view of the motor assembly 100. The motor assembly 100 comprises a housing 102 having a motor position therein. The motor assembly 100 further comprises a spindle 104, a chain ring 106, an output member 107, and a bearing support member 110. The output member 107 is coupled to the chain ring 106 and is configured to rotate with respect to the housing 102 about a central rotational axis of the motor assembly 100 (e.g., axis 126 of FIG. 1I). In this embodiment, the motor and/or the spindle 104 can be configured to drive the output member 107, to cause the chain ring 106 to rotate the chain of the bicycle. The spindle 104 is configured to be coupled to a pedal crank of a bicycle, such as by using the splines seen in FIG. 1A. The spindle 104 can be coupled to the output member 107 via a one-way clutch, further described below, to enable the chain ring 106 to freewheel without causing the spindle 104 to rotate.

Figure 1B:
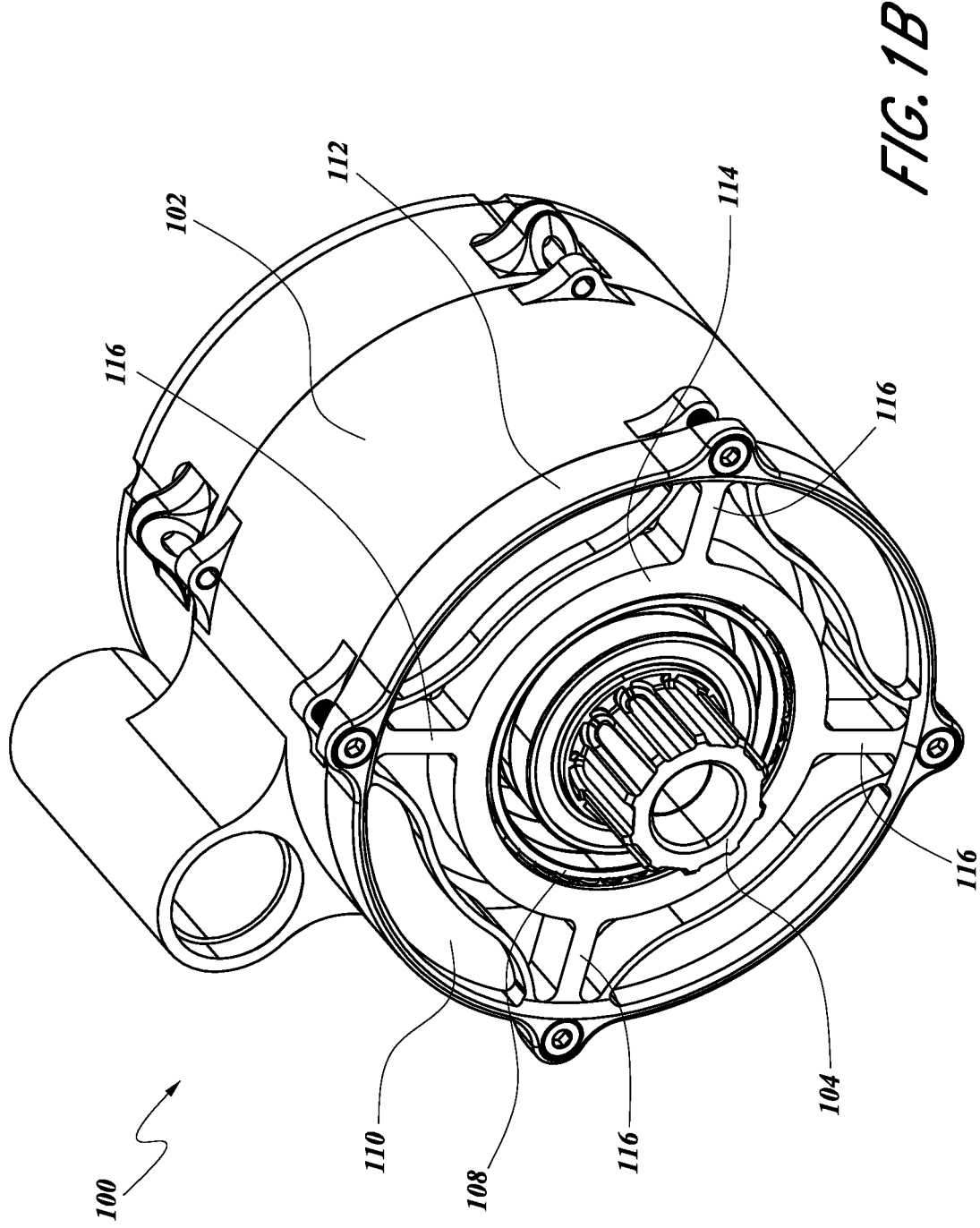

FIG. 1B illustrates the motor assembly 100 with the chain ring 106 and output member 107 hidden. This allows more details of the bearing support member 110 to be seen. The bearing support member 110 comprises an outer portion 112 that is coupled to the housing 102, an inner portion 114 that is coupled to an outer race of bearing 108, and a plurality of beams 116 connecting the inner portion 114 to the outer portion 112. In this embodiment, four beams 116 are evenly spaced about a periphery of the inner portion 114. In other embodiments, however, fewer or more beams 116 may be used, such as one, two, three, five, six, seven, eight, or more. Further, in other embodiments, the beams may or may not be evenly spaced about a periphery of the inner portion 114. In some embodiments, the beams are desirably positioned to have a planar surface (e.g., surface 124 of FIG. 1I) aligned parallel to or perpendicular to a direction of force that is desired to be measured. For example, with reference to FIG. 1F, which illustrates a direction of a chain pull force, two of the beams 116 are oriented to be parallel to the direction of force, and two of the beams 116 are oriented to be perpendicular to the direction of force. Such an arrangement may enable more accurate measurement of force along the desired direction of force measurement. Other arrangements are envisioned, however, including arrangements where one or more beams are not aligned with the desired direction of force measurement.

Figure 1D:
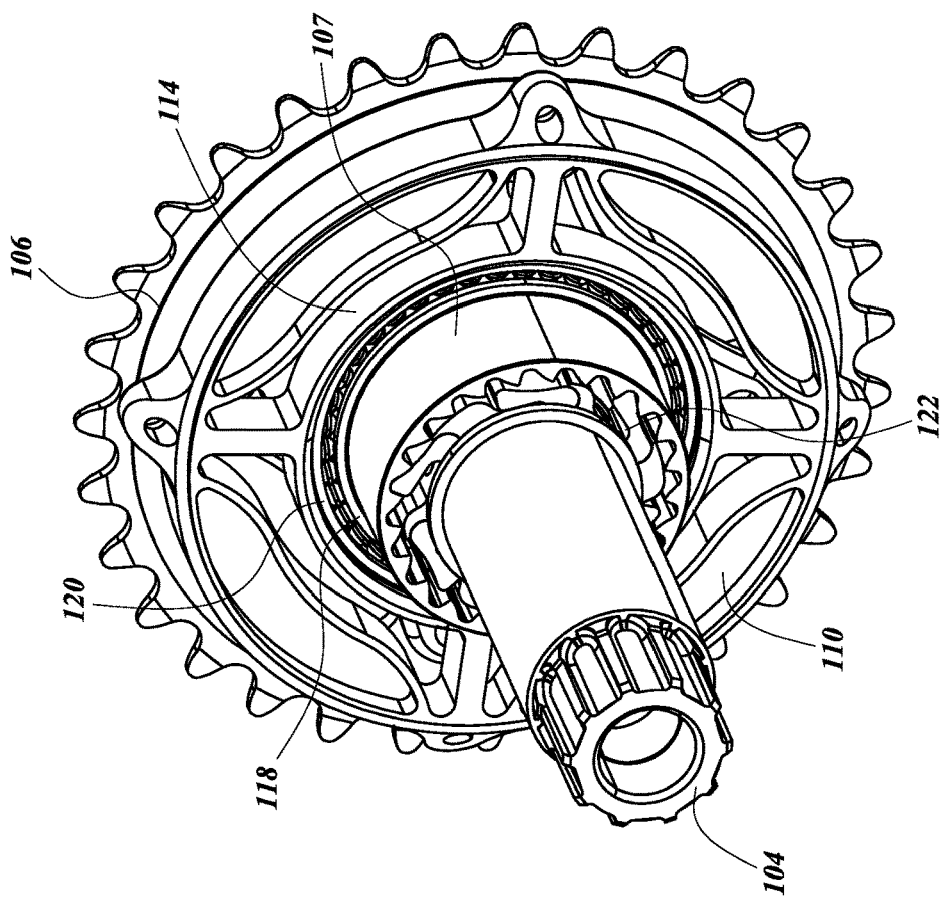
Figure 1C:
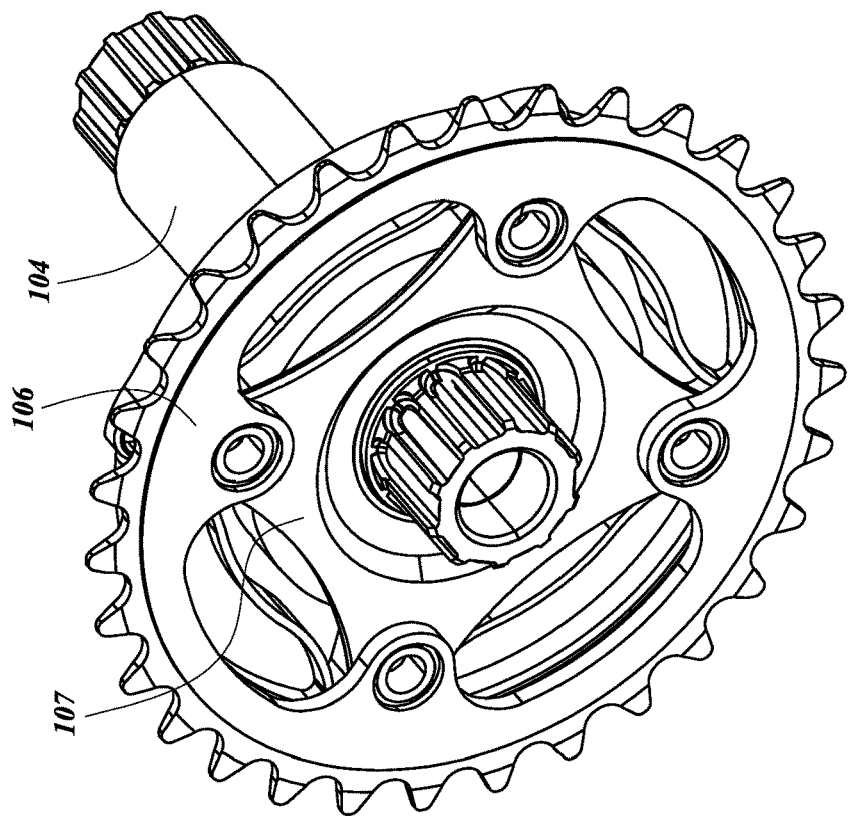
Figure 1E:
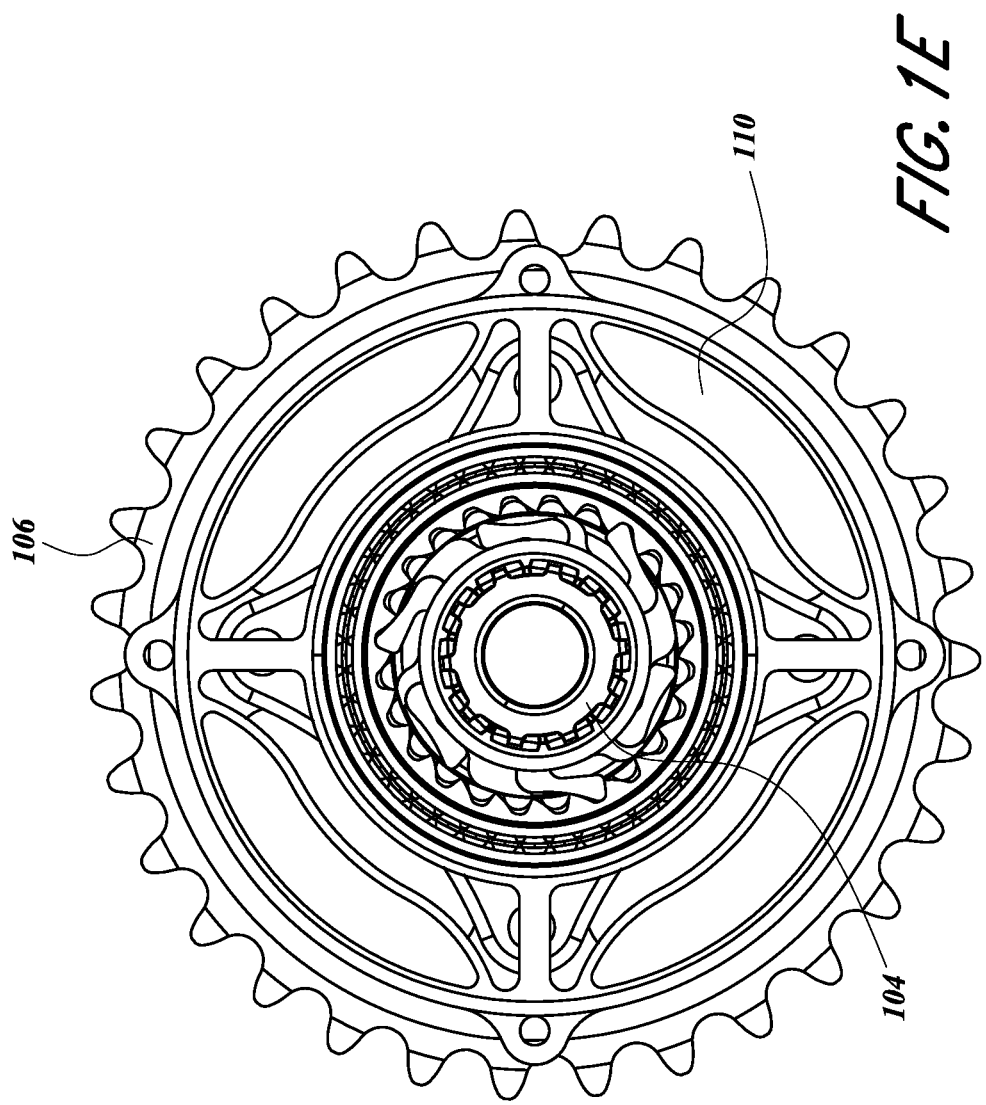

FIGS. 1C-1E illustrate the chain ring 106, output member 107, spindle 104, and bearing support member 110 removed from the rest of the motor assembly 100. FIG. 1C is a front perspective view, FIG. 1D is a rear perspective view, and FIG. 1E is a rear view. With reference to FIG. 1D, it can be seen that the bearing 108 comprises an outer race 110 that is coupled to the inner portion 114 of the bearing support member 110, and an inner race 118 that is coupled to the output member 107. Further, a one-way clutch 122 selectively couples the spindle 104 to the output member 107 to enable transfer of torque from the spindle 104 to the output member 107. In this embodiment, the one-way clutch 122 comprises a plurality of pawls; however, other embodiments may use different one-way clutch designs and/or may directly couple the spindle 104 to the output member 107 and/or chain ring 106.

Figure 1F:
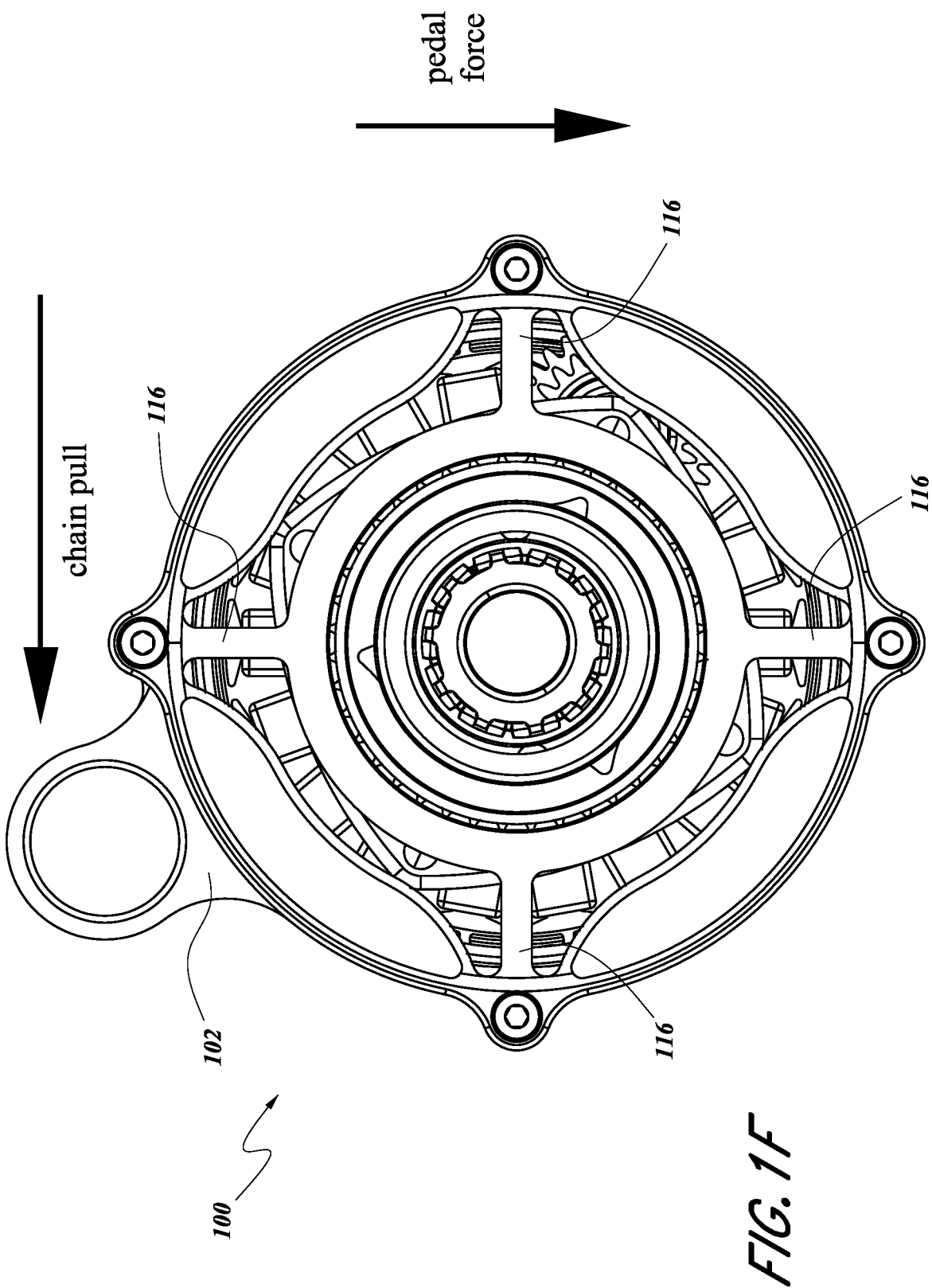

FIG. 1F illustrates a front view of the motor assembly 100 with the chain ring and output member removed. As mentioned above, this figure illustrates a direction of a chain pull force, with the force being oriented substantially parallel to the left and right beams 116, and substantially perpendicular to the top and bottom beams 116. It may be desirable to measure the magnitude of the chain pull force, as a part of determining the pedal input torque. Accordingly, one or more strain gauges may be coupled to one or more of the beams 116, as further described below. In this example, if a strain gauge is coupled to each of the four beams 116, the strain gauges attached to the top and bottom beams 116 would desirably detect strain due to the top and bottom beams 116 bending as a result of the chain pull force. Further, the strain gauges attached to the left and right beams 116 would desirably detect strain due to the left and right beams being placed into tension or compression as a result of the chain pull force. In some embodiments, it may be desirable to position strain gauges on opposite sides of the beams 116, for example, to help the controller to differentiate between bending or tension strain of the beams 116.

Figure 1H:
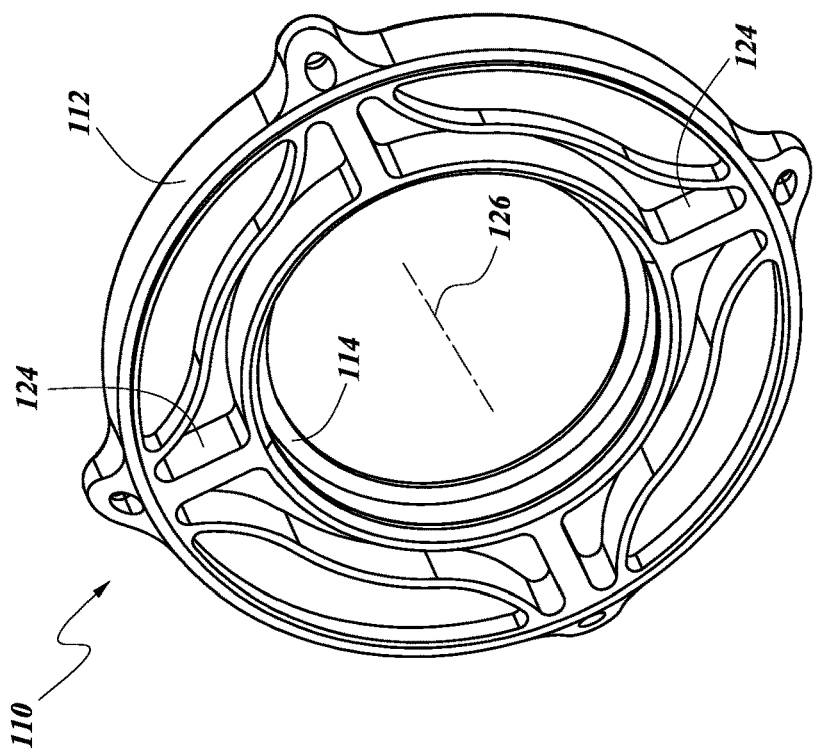
Figure 1G:
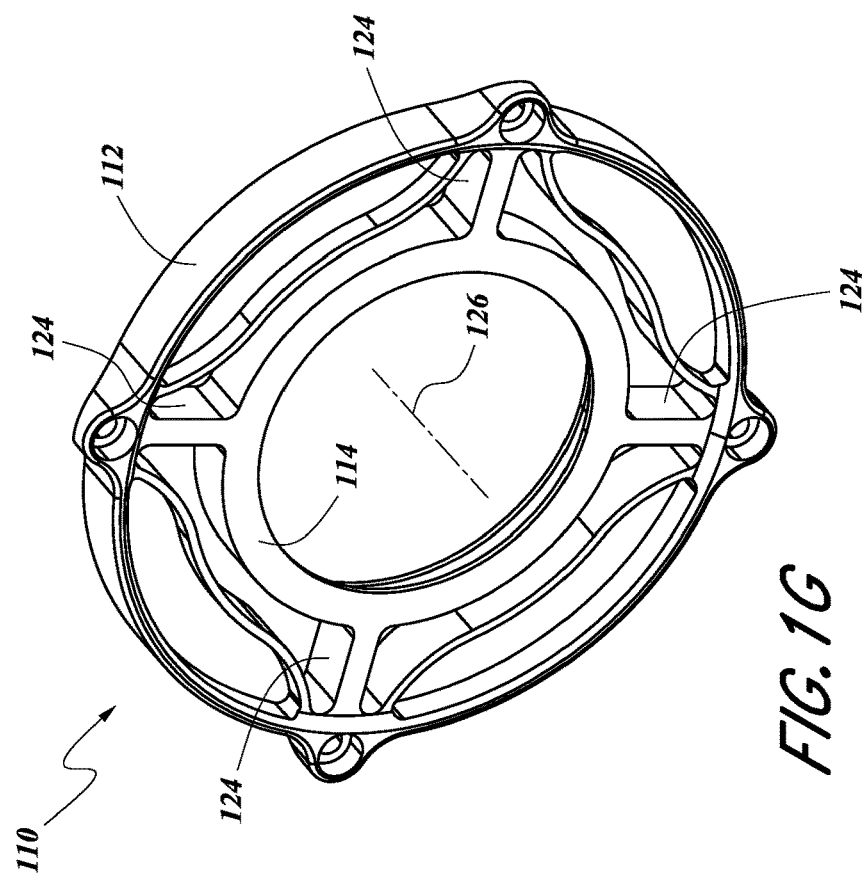

FIGS. 1G-1K illustrate various views of the bearing support member 110. FIG. 1G illustrates a front perspective view, FIG. 1H illustrates a back perspective view, and FIG. 1I illustrates a front view. FIG. 1J illustrates a cross-sectional view taken through a plane oriented vertically with respect to the orientation of FIG. 1I. FIG. 1K illustrates a cross-sectional view taken through a plane oriented at approximately 45° to the cross-sectional plane of FIG. 1J.

With reference to FIG. 1I, reference number 124 illustrates a plurality of planar surfaces of the beams 116 where a strain gauge may be affixed to enable detection of strain in that beam. In this embodiment, eight potential locations are identified, one on either side of each of the four beams 116. In some embodiments, eight strain gauges may be used, with one being positioned at each location 124 called out in FIG. 1I. In some embodiments, a smaller number of strain gauges may be utilized, such as: four strain gauges, with one strain gauge positioned on each beam 116; one or two strain gauges positioned on a single beam 116; one or two strain gauges positioned on less than all four of the beams 116; and/or the like. Accordingly, with the embodiment of a bearing support member 110 illustrated in FIG. 1I, anywhere from one to eight strain gauges may be used.

It may be desirable to use a plurality of strain gauges, instead of just one strain gauge, for example, to enable more accurate and/or more sensitive detection of forces that can help the controller to determine the rider pedaling torque.

Further, it may be desirable to position strain gauges in separate quadrants of the circular periphery of the inner member 114, since beams 116 in different quadrants may exhibit different amounts of strain depending on a direction and/or magnitude of the rider pedaling force. Further, it may be desirable to position strain gauges in a manner that at least two of a plurality of strain gauges are oriented along planar surfaces that are not parallel to one another. For example, with respect to the orientation of the planar surfaces 124 shown in FIG. 1I, each of the planar surfaces 124 is oriented either vertically or horizontally. Stated differently, four of the planar surfaces 124 of FIG. 1I are parallel to a horizontal plane of FIG. 1I, and another four of the planar surfaces 124 are oriented 90° from the horizontal plane (or transverse to the other four surfaces 124), parallel with a vertical plane of FIG. 1I. Having strain gauges oriented along planes that are not parallel to one another can be advantageous, because, among other things, it can enable more sensitive and/or accurate detection of forces that are oriented in a variety of directions. This can be advantageous in an electric bicycle, where forces may be introduced from a variety of sources and/or along a variety of directions. For example, with respect to the orientation of the bearing support member 110 as illustrated in FIG. 1I, if a pedaling force (and/or a force from a rider standing on the pedals) were oriented in a downward direction, the leftmost and rightmost beams 116, which are oriented parallel to the horizontal plane, may experience more bending than the topmost and lowermost beams 116, which are oriented parallel to the vertical plane, and the top and bottom beams 116 may experience more tension or compression than the other beams. As another example, if a chain pull force were oriented in a leftward direction, the top and bottom beams 116 may experience more bending than the other beams, and the left and right beams 116 may experience more tension or compression than the other beams. Although this embodiment illustrates planar surfaces 124 that are oriented 90° apart from one another, other embodiments may comprise surfaces for mounting a strain gauge thereto that are oriented at different angles apart from one another, such as, for example, 30°, 45°, 60°, 80°, and/or the like. Further, in some embodiments, surfaces other than planar may be used.

Desirably, the beams 116 are shaped such that the planar surfaces 124 of the beams 116 will exhibit compression or tension strain as a result of a rider pedaling torque, a motor torque, and/or a chain pull force on the assembly. It can be desirable to limit this compression or tension strain of surfaces 124 to an amount that is sufficiently detectable by a strain gauge, but that is not enough to significantly reduce the efficiency of the rider pedaling torque transferred to the chain and/or to cause fatigue in the beams 116. Further, it can be desirable to limit deflection or bending of the beams 116 in any other direction, such as in an axial direction parallel to the axis 126 illustrated in FIGS. 1G-1I. Accordingly, it can be desirable to shape the beams 116 such that they have a higher resistance to bending or deflection about an axis that is perpendicular to the axis 126 and a lower resistance to bending or deflection about an axis that is parallel to the axis 126. One way to accomplish this is by using a shape of the beams 116 that is wider in a direction parallel to the axis 126 than in a direction perpendicular to the axis 126. For example, with reference to FIGS. 1I and 1J, the beams 116 of this embodiment comprise a width A (perpendicular to the axis 126) of approximately 4.5 mm, and a depth C (parallel to the axis 126) of approximately 10 mm. Further, in this embodiment, a length B of the planar surfaces 124 is approximately 11.3 mm. It should be noted that these dimensions are merely one example, and various other embodiments may use different dimensions.

In some embodiments, it may be desirable for a ratio of the depth C to the width A to be at least 2.0. In some embodiments, it may be desirable for this ratio to be lower or higher, such as at least 1.5, 1.75, 2.25, 2.5, 2.75, or 3.0. In some embodiments, it may be desirable for the ratio of the depth C to the width A to be within a range of 1.5 to 2.5.

The bearing support member 110 and the beams 116 may comprise any material that enables the surfaces 124 of the beams 116 to exhibit tension and/or compression in response to a rider pedaling torque, a motor torque, and/or a chain pull force on the assembly. The bearing support member 110 may, for example, comprise aluminum, steel, polymer, composite, and/or the like.

Although the drawings included herewith illustrate one example embodiment of how a rider pedaling force may be detected, various other techniques may also be used. For example, instead of, or in addition to, measuring strain of the beams 116, the spindle itself may have a torque sensor, such as one or more strain gauges, mounted thereto and/or integrated therein.

Pedal Drive Torque Sensing

Figure 2:
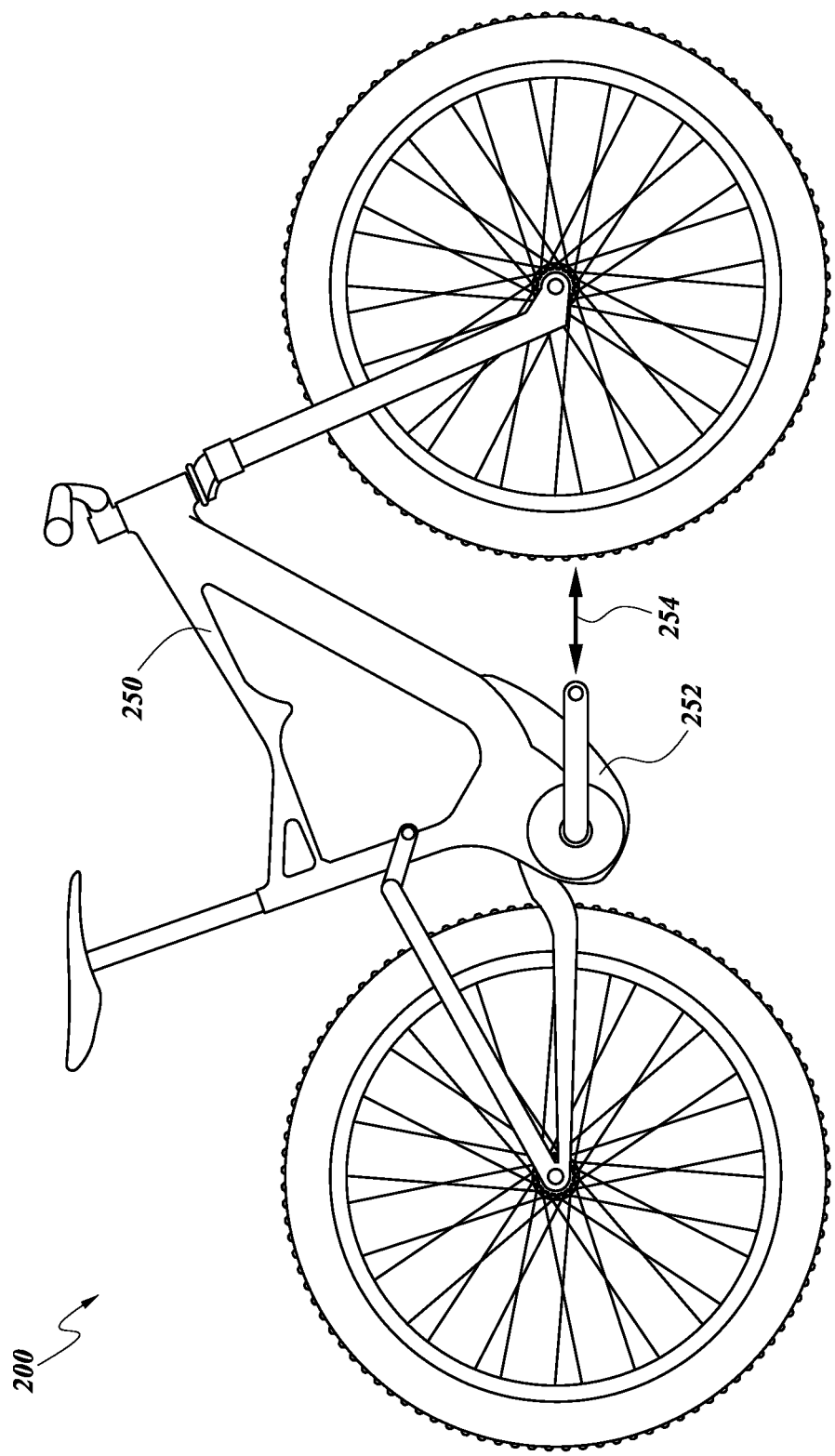
FIG. 2 illustrates an embodiment of a mid drive electric bicycle.

FIG. 2 illustrates an embodiment of a mid drive electric bicycle 200. The electric bicycle 200 comprises a bicycle frame 250 that comprises a bottom bracket area 252. The bottom bracket area 252 may incorporate a motor assembly comprising one or more of the features disclosed herein, such as the motor assembly 100 described above. The electric bicycle 200 may further comprise a controller that is configured to at least partially automatically control the motor responsive to a signal generated by the one or more strain gauges of the motor assembly. Arrow 254 shown on FIG. 2 illustrates a horizontal orientation along which a horizontal component of a reaction force on the bottom bracket may be measured. Measurement of such a horizontal reaction force may be beneficial in, for example, calculating a pedal drive torque, as further described below.

The devices disclosed herein can be used to, for example, measure or derive a pedal drive torque applied by a rider of a pedal assist electric bicycle. This can be desirable, for example, because in a pedal assist electric bicycle, the total torque being applied to the drive wheel of the bicycle is a combination of motor torque and pedal torque. It can be difficult, however, to provide a smooth total torque to the drive wheel when the pedal torque introduced by the rider can be relatively sporadic and/or unpredictable. Further, it can be desirable for the motor output to be at least somewhat proportional to the rider pedal torque input. Accordingly, it can be desirable to have methods of measuring the pedal drive torque that are relatively accurate and quick. The devices disclosed herein, and the methods or techniques discussed below can desirably achieve such a relatively accurate and quick measurement.

One problem with measuring a pedal drive torque using strain gauges is that the forces introduced by a rider on the pedals of the bicycle may include more than just forces that contribute to the pedal drive torque. For example, a rider may often stand on both the left and right pedals without rotating the crank. In such a situation, there is a force transmitted from the pedals to the bottom bracket as a result of the rider standing on the pedals, but there is no pedaling effort, thus there is no pedal drive torque. Further, even when a rider is pedaling to create a pedal drive torque, there is often still some downward force on both pedals. Essentially, one foot at least partially works against the other. Further, a rider's pedaling input may in many cases be oriented predominantly in the vertical direction. Accordingly, one problem is the difficulty imposed by trying to distinguish a vertical standing force from a vertical pedaling force. FIG. 1F illustrates a direction of a pedaling force, which may be substantially vertical (and which may be the same as the direction of the standing force). The pedaling force is oriented approximately at a right angle to the chain pull force, although those forces may not always be at a right angle to one another.

The pedal drive torque input by the rider can, in some embodiments, be defined as the difference in tangential pedal force between the left and right pedals. The pedal drive torque can be used to pull a chain or belt, and the pulling in the chain or belt caused by the pedal drive torque can be called the pedal drive tension. One additional complicating factor, however, is that the pedal drive tension is not the only tension in the chain or belt. For example, there is typically a preload on the chain or belt, and in an electric bicycle there is also a motor drive tension in the chain or belt caused by the torque of the motor. Desirably, the system can be configured to monitor the torque of the motor electronically, thus allowing the system to subtract the motor drive tension from the overall tension in the chain or belt, to help measure or derive the pedal drive tension. Further, the system may be configured to measure the preload tension when the bicycle is at rest, so that the system can also subtract the preload tension from the overall tension in the chain or belt, to help measure or derive the pedal drive tension.

The drive chain or belt can be desirably oriented approximately horizontally with respect to the frame of the bicycle. In order to measure the tension in the drive chain or belt, it can be desirable to have one or more beams of the bottom bracket assembly oriented horizontally or approximately horizontally, with one or more strain gauges mounted to the one or more beams to measure strain in the approximately horizontal direction. In such a configuration, the horizontal strain can be proportional to the pedal drive tension plus the motor drive tension.

Having the beams oriented approximately horizontally can further be desirable, for example, because when someone is standing on both pedals the force introduced by the rider will be approximately vertical and desirably will not produce horizontal strain, or will produce a small or negligible amount of horizontal strain. With such a configuration, the system can be configured to calculate the pedal drive tension by measuring the horizontal strain at the bottom bracket (such as by using any of the embodiments described above), and subtracting out the horizontal strain caused by the motor (which the system can determine by monitoring the torque of the motor). Once the pedal drive tension is known, that can be utilized as an input into the system to determine how much torque should be output from the motor to supplement the pedal drive torque.

Although the previous paragraph describes the desirability of a system having one or more beams oriented horizontally, other orientations may also be used. For example, beams may be oriented horizontally, vertically, anywhere in between, and use any combination thereof. The system can be configured to take the beams' orientations into account to, for example, extract the component of any detected strain that is indicative of a force being applied along the desired direction of measurement (for example, the chain pull direction).

Figure 3:
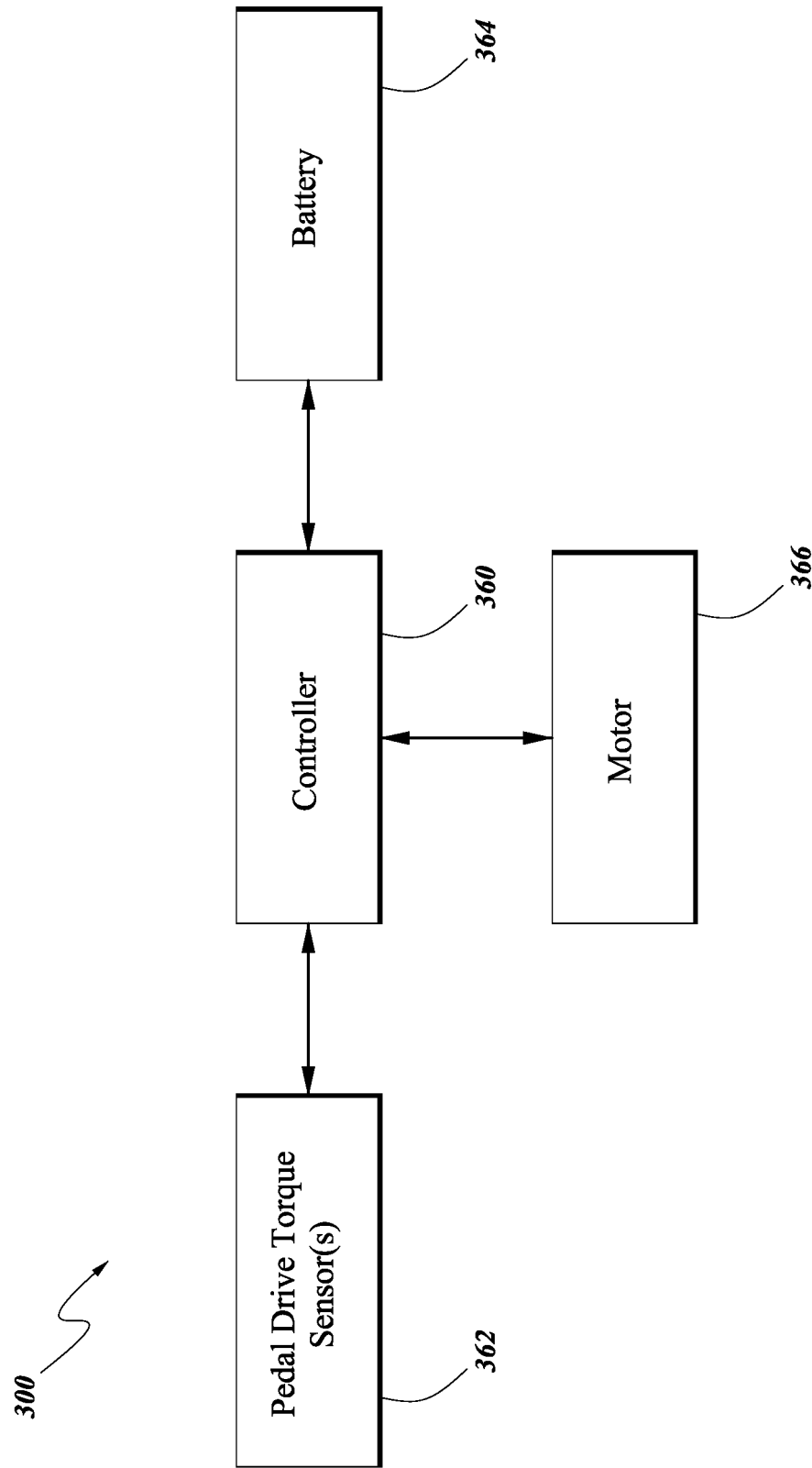
FIG. 3 illustrates a block diagram of an embodiment of an electric bicycle control system.

FIG. 3 illustrates a block diagram of a simplified version of an electric bicycle control system 300. The control system 300 comprises a controller 360 that can be configured to communicate with pedal drive torque sensors 362, such as any of the pedal drive torque sensing devices disclosed herein (for example, the strain gauges described above). The controller 360 can also be configured to communicate with a motor 366 to, for example, control and/or monitor an output torque of the motor. The controller 360, motor 366, and any other electrical components of the electric bicycle may receive power from a battery 364. In some embodiments, the controller 360 comprises a computer processor and electronic memory. The computer processor can be configured to process signals received from the pedal drive torque sensors 362, using any of the methods described herein, to derive or calculate the pedal drive torque, and thus to also determine how to coordinate control of the motor 366 in combination with the pedal drive torque.

Figure 4:
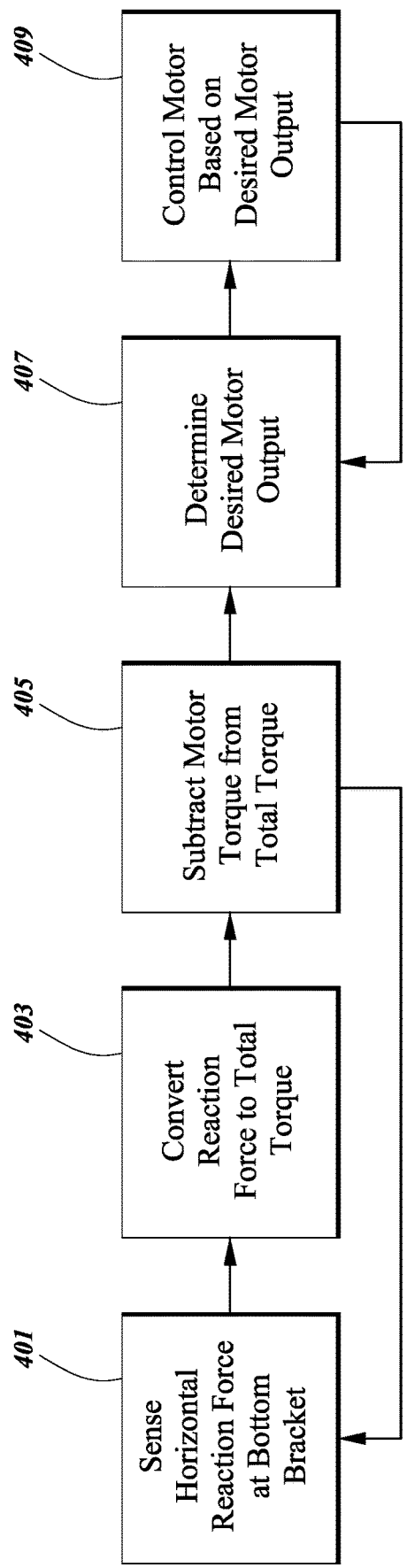
FIG. 4 illustrates an embodiment of a process flow diagram for controlling a motor based on a pedal torque input.

FIG. 4 illustrates an example embodiment of a process for determining (e.g., sensing) a pedal input torque and using the determined pedal input torque as an input in controlling the motor of a pedal assist bicycle. The process illustrated in FIG. 4 may be implemented by, for example, the electric bicycle control system 300 of FIG. 3. The process begins at block 401, where a horizontal reaction force (e.g., a value of a horizontal reaction force) at the bottom bracket is sensed. For example, devices as disclosed herein that use strain gauges to detect strain at the bottom bracket may be used to detect forces that are currently being applied to the bottom bracket. Those forces may include, for example, a chain pull force oriented approximately horizontally, a rider standing force oriented approximately vertically, a rider pedaling input force oriented approximately vertically, and/or the like. In some embodiments, the system may be configured to analyze signals from one or more strain gauges to separate out the horizontal component of strain from other strain on the bottom bracket. Accordingly, the system can be configured to sense the horizontal reaction force at the bottom bracket, such as the reaction force caused by the chain pull force. It should be noted that, although this and other descriptions refer to a horizontal reaction force, in some embodiments, it may be desirable to measure a force that is not exactly horizontal. Further, although this embodiment is described as using strain gauges to detect the horizontal reaction force, other force detection mechanisms may be used, alone or in combination, such as capacitive sensors, eddy current sensors, hall effect sensors, and/or the like.

At block 403, the system can be configured to convert the reaction force detected at block 401 into a total torque value. For example, the system may be configured to multiply the horizontal reaction force detected at block 401 by a chain ring radius. At block 405, the system can be configured to subtract the motor torque (e.g., a value of the motor torque) from the total torque value determined at block 403. For example, the system may know the motor torque by monitoring the motor phase current and multiplying that by the motor torque constant. Once the motor torque is subtracted from the total torque, the remaining torque is desirably the pedal drive torque introduced by the rider.

At block 407, the system can be configured to determine a desired motor output based at least partially on the determined pedal drive torque from block 405. For example, the system may be configured to increase or decrease the motor output in proportion to the pedal drive torque. It should be noted that the pedal drive torque is not necessarily a consistent torque value. For example, during normal riding of a bicycle, the pedal drive torque may generally take the shape of a sine wave if plotted as pedal drive torque versus crank angle. Stated another way, as the crank and pedals rotate, the pedal drive torque will increase and decrease with the position of the pedals. In many cases, the peak pedal drive torque will occur when the pedals and pedal crank are oriented near horizontal, such as within about 10 to 20° of being horizontal. Further, in many cases, the lowest pedal drive torque will occur when the pedals and pedal crank are oriented closer to vertical, such as within about 10 to 20° of being vertical.

One potential problem associated with such a sinusoidal pedal drive torque input, is that it may not be desirable to have the motor output be proportional to the pedal drive torque at every instant. For example, if the motor output is proportional to the pedal drive torque as the pedal drive torque increases and decreases during a full revolution of the crank (or half revolution of the crank), the motor output will also take on a higher amplitude sinusoidal shape, which could lead to undesirable torque output characteristics. For example, the electric bicycle may experience a jerky motion resulting from substantial peaks and valleys in the motor torque output. One solution to this problem is to, at block 407, consider more than just the current prior pedal drive torque in determining a desired motor output. For example, the system may be configured to determine the average pedal drive torque (e.g., a value of the average pedal drive torque) over a certain period of time, such as the previous 180° of crank angle, the previous 360° of crank angle, and/or the like. The average pedal drive torque can then be used at block 407 in determining a desired motor output that may be at least partially proportional to the average pedal drive torque. As another example, the system may be configured to determine the peak pedal drive torque over a certain period of time, such as the previous 180° of crank angle, the previous 360° of crank angle, and/or the like. The peak pedal drive torque can then be used at block 407 in determining a desired motor output that may be at least at least partially proportional to the peak pedal drive torque. One advantage of using the peak pedal drive torque over the average pedal drive torque is that less computing power may be required, thus desirably leading to a quicker response than averaging.

After a desired motor output is determined at block 407, the system can be configured to control the motor based on that desired motor output at block 409. For example, the controller 360 of FIG. 3 may communicate with the motor 366 to cause the motor 366 to operate at a desired torque, speed, and/or level of current.

The process illustrated in FIG. 4 may be a continuous process while an electric bicycle is operating in a pedal assist mode. For example, the first three blocks (401, 403, and 405) may be repeated to continuously determine the current pedal drive torque. Further, the last two blocks (407 and 409) may be continuously repeated to adjust the motor output based on the current status of the pedal drive torque.

Following is one example set of equations that may be used by, for example, the controller 360 of FIG. 3, to calculate or derive the pedal drive torque. These equations may be used, for example, during blocks 401-405 of the process of FIG. 4.

For example, the pedal drive torque may be calculated using equation 1, as follows.

$$\text{Pedal Drive Torque} = (\text{Horizontal Force on Bottom Bracket} \times \text{Chain Ring Radius}) - (\text{Motor Torque Constant} \times \text{Motor Phase Current}) \quad \text{Eq. 1}$$

In equation 1, the chain ring radius and motor torque constant will be constant values for a particular bicycle configuration and current gear selection. For example, in an electric bicycle having a specific motor and a single gear, the chain ring radius and motor torque constant will remain constant. In some embodiments, however, the electric bicycle may include a number of gears, such as in a bicycle that uses a chain that moves among a plurality of gears with a derailleur. In such an embodiment, the system may further be configured to detect and/or know the current gear that the bicycle is in, which will correspond to a specific chain ring radius for that gear.

The motor phase current in equation 1 may be determined by, for example, the controller 360, at any instant in time due to the communication between the controller 360 and motor 366. The horizontal force on the bottom bracket in equation 1 may be determined by, for example, the controller 360 analyzing a signal or signals from one or more strain gauges or other devices, such as any of the devices disclosed herein.

The following equations illustrate three specific equations that were combined to create Equation 1.

$$\text{Pedal Drive Torque} = \text{Total Torque} - \text{Motor Torque} \quad \text{Eq. 2}$$

$$\text{Total Torque} = \text{Horizontal Force on Bottom Bracket} \times \text{Chain Ring Radius} \quad \text{Eq. 3}$$

$$\text{Motor Torque} = \text{Motor Torque Constant} \times \text{Motor Phase Current} \quad \text{Eq. 4}$$

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present inventions herein disclosed should not be limited by the particular disclosed embodiments described above.

What is claimed is:

1. A device for sensing a bicycle pedaling torque input, the device comprising:
   a housing;
   a bearing defining a rotational axis, the bearing having an inner race and an outer race;
   a bearing support member that positions the bearing with respect to the housing, the bearing support member comprising:
   an outer portion coupled to the housing;

an inner portion coupled to the outer race of the bearing; and one or more beams positioned about a periphery of the inner portion and connecting the inner portion to the outer portion wherein the one or more beams are shaped to have a lower resistance to bending about an axis parallel to the rotational axis than to bending about an axis perpendicular to the rotational axis;

an output member configured to be coupled to a chain ring, the output member being coupled to the inner race of the bearing to enable the output member to rotate with respect to the housing about the rotational axis;

a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled to one of the one or more beams of the bearing support member to enable electronic sensing of strain in the beam the strain gauge is coupled to in response to the rider pedaling force applied to the spindle.

2. The device of claim 1, wherein the one or more beams comprises a plurality of beams.

3. The device of claim 1, wherein the one or more strain gauges comprises a plurality of strain gauges.

4. The device of claim 1, wherein the one or more beams comprise a depth measured parallel to the rotational axis and a width measured perpendicular to the rotational axis, the depth being greater than the width.

5. The device of claim 1, wherein each of the one or more strain gauges is coupled to a beam surface of the beam to which the strain gauge is coupled that will exhibit tension or compression when the beam bends about an axis parallel to the rotational axis.

6. The device of claim 1, wherein each of the one or more strain gauges is coupled to a planar beam surface of the beam to which the strain gauge is coupled that defines a plane parallel to the rotational axis.

7. The device of claim 1, wherein the one or more beams comprise a plurality of beams, and the plurality of beams are equally spaced about the periphery of the inner portion of the bearing support member.

8. The device of claim 1, wherein the spindle is functionally coupled to the output member through a one-way clutch.

9. The device of claim 1, wherein the one or more beams comprises more than two beams.

10. The device of claim 1, wherein the one or more beams comprises exactly four beams.

11. The device of claim 1, wherein the one or more beams comprises more than four beams.

12. The device of claim 1, further comprising:
a motor coupled to the housing and the output member to enable powered rotation of the output member about the rotational axis; and
a controller configured to automatically control the motor at least partially based on strain detected by one or more of the one or more strain gauges.

13. The device of claim 1, further comprising a bicycle frame, wherein the housing is coupled to or forms a bottom bracket area of the bicycle frame.

14. A method of controlling a pedal assist electric bicycle, comprising:
sensing a value of a horizontal reaction force on a bottom bracket of the pedal assist electric bicycle;
converting the value of the horizontal reaction force that is sensed to a total torque value;
subtracting a value of motor torque from the total torque value to determine a value of pedal torque;
determining, by an electric bicycle controller, a desired motor output based at least partially on the value of the pedal torque that is determined; and
outputting a motor control signal to a motor of the pedal assist electric bicycle to cause the motor to produce the desired motor output.

15. The method of claim 14, wherein sensing the value of the horizontal reaction force on the bottom bracket comprises using a device that comprises:
a housing;
a bearing defining a rotational axis, the bearing having an inner race and an outer race;
a bearing support member that positions the bearing with respect to the housing, the bearing support member comprising:
an outer portion coupled to the housing;
an inner portion coupled to the outer race of the bearing; and
one or more beams positioned about a periphery of the inner portion and connecting the inner portion to the outer portion;
an output member configured to be coupled to a chain ring, the output member being coupled to the inner race of the bearing to enable the output member to rotate with respect to the housing about the rotational axis;
a spindle configured to be coupled to a bicycle pedal crank, the spindle functionally coupled to the output member to enable a rider pedaling force applied to the spindle to cause rotation of the output member; and
one or more strain gauges, each of the one or more strain gauges being coupled to one of the one or more beams of the bearing support member to enable electronic sensing of strain in the beam the strain gauge is coupled to in response to the rider pedaling force applied to the spindle.

16. The method of claim 15, wherein sensing the value of the horizontal reaction force comprises sensing a value of strain in at least one strain gauge that is coupled to a planar surface of a beam that is oriented horizontally.

17. The method of claim 15, wherein sensing the value of the horizontal reaction force comprises sensing a value of strain in at least one strain gauge that is coupled to a planar surface of a beam that is oriented at an orientation other than horizontal.

18. The method of claim 14, wherein converting the value of the sensed horizontal reaction force to the total torque value comprises multiplying the value of the horizontal reaction force that is sensed by a chain ring radius.

19. The method of claim 14, wherein determining the desired motor output comprises determining a value of average or peak pedal torque over at least a last 180 degrees of crank angle.

20. A device for sensing a bicycle pedaling torque input, the device comprising:
a housing;
a bearing defining a rotational axis, the bearing having an inner race and an outer race;
a bearing support member that positions the bearing with respect to the housing, the bearing support member comprising:
an outer portion coupled to the housing;
an inner portion coupled to the outer race of the bearing; and one or more beams positioned about a periphery of the inner portion and connecting the inner portion to the outer portion,
wherein the one or more beams comprise a depth measured parallel to the rotational axis and a width measured perpendicular to the rotational axis, the depth being greater than the width;

an output member configured to be coupled to a chain ring, the output member being coupled to the inner race of the bearing to enable the output member to rotate with respect to the housing about the rotational axis;

a spindle configured to be coupled to a bicycle pedal crank, the spindle functionally coupled to the output member to enable a rider pedaling force applied to the spindle to cause rotation of the output member; and one or more strain gauges, each of the one or more strain gauges being coupled to one of the one or more beams of the bearing support member to enable electronic sensing of strain in the beam the strain gauge is coupled to in response to the rider pedaling force applied to the spindle.

21. The device of claim 20, wherein the one or more beams comprises a plurality of beams, the one or more strain gauges comprises a plurality of strain gauges, and each of the plurality of strain gauges is coupled to a beam surface of the beam to which the strain gauge is coupled that will exhibit tension or compression when the beam bends about an axis parallel to the rotational axis.

22. The device of claim 20, wherein the one or more beams are shaped to have a lower resistance to bending about an axis parallel to the rotational axis than to bending about an axis perpendicular to the rotational axis.

23. The device of claim 20, further comprising:

a motor coupled to the housing and the output member to enable powered rotation of the output member about the rotational axis; and a controller configured to automatically control the motor at least partially based on strain detected by one or more of the one or more strain gauges.

* * * * *

UNITED STATES PATENT AND TRADEMARK OFFICE
CERTIFICATE OF CORRECTION

PATENT NO. : 11,066,124 B2  
APPLICATION NO. : 16/225382  
DATED : July 20, 2021  
INVENTOR(S) : Neal Tate Saiki Page 1 of 1

It is certified that error appears in the above-identified patent and that said Letters Patent is hereby corrected as shown below:

On the Title Page

In Column 2, item (74), Attorney, Agent, or Firm, Line 1, delete "Knobe," and insert --Knobbe,--.

In the Specification

In Column 9, Line 41, delete "80° ," and insert --80°,--.

In the Claims

In Column 15, Line 5, Claim 1, delete "portion" and insert --portion,--.

Signed and Sealed this  
Eleventh Day of January, 2022

Drew Hirshfeld  
*Performing the Functions and Duties of the  
Under Secretary of Commerce for Intellectual Property and  
Director of the United States Patent and Trademark Office*